US010919484B2

United States Patent
Ito et al.

(10) Patent No.: US 10,919,484 B2
(45) Date of Patent: Feb. 16, 2021

(54) PEDESTRIAN PROTECTING AIRBAG APPARATUS

(71) Applicant: Autoliv Development AB, Vargarda (SE)

(72) Inventors: Satoshi Ito, Kanagawa (JP); Atsushi Tamura, Kanagawa (JP); Akifumi Hanawa, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 38 days.

(21) Appl. No.: 16/503,767

(22) Filed: Jul. 5, 2019

(65) Prior Publication Data

US 2020/0010045 A1   Jan. 9, 2020

(30) Foreign Application Priority Data

Jul. 5, 2018 (JP) ................................ 2018-128097
Jun. 5, 2019 (JP) ................................ 2019-105081

(51) Int. Cl.
*B60R 21/36* (2011.01)
*B60R 21/20* (2011.01)
*B60R 21/2334* (2011.01)
*B60R 21/16* (2006.01)

(52) U.S. Cl.
CPC ............ *B60R 21/36* (2013.01); *B60R 21/20* (2013.01); *B60R 21/2334* (2013.01); *B60R 2021/161* (2013.01)

(58) Field of Classification Search
CPC ...... B60R 21/36; B60R 21/20; B60R 21/2334
See application file for complete search history.

(56) References Cited

U.S. PATENT DOCUMENTS 7,584,988 B2 *  9/2009  Okamoto ................ B60R 21/36
                                                   180/274
7,828,319 B2 * 11/2010  Takimoto ............... B60R 21/36
                                                   280/730.1
(Continued)

FOREIGN PATENT DOCUMENTS

EP       2287048 B1    1/2013
JP    2013502342 A    1/2013
(Continued)

*Primary Examiner* — Faye M Fleming
(74) *Attorney, Agent, or Firm* — Stephen T. Olson; Harness, Dickey & Pierce, P.L.C.

(57) ABSTRACT

[Problem] To improve the energy absorption amount in a region for covering a pillar without increasing the gas generation amount of an inflator and without causing a shortage in the energy absorption amount in a region for covering the vicinity of the end on the hood side of a front glass.
[Resolution means] A pedestrian protecting airbag apparatus includes: an airbag for covering the vicinity of the end on the hood side of a front glass along with at least a part on the lower side of a pillar; and an inflator for supplying gas to the airbag during a collision. The airbag includes: a center chamber for covering the vicinity of the end on the hood side of the front glass; a pillar cover chamber for covering at least the part on the lower side of the pillar; and a support chamber for expanding between this pillar cover chamber and the pillar.

19 Claims, 4 Drawing Sheets

(56) References Cited

U.S. PATENT DOCUMENTS

| | | | |
|---|---|---|---|
| 7,845,454 B2* | 12/2010 | Takimoto | B60R 21/2338 |
| | | | 180/274 |
| 8,727,061 B2 | 5/2014 | Rydsmo et al. | |
| 8,955,634 B2* | 2/2015 | Bergenheim | B60R 21/2342 |
| | | | 180/274 |
| 9,102,304 B2* | 8/2015 | Rick | B60R 21/235 |
| 10,196,031 B2* | 2/2019 | Aiba | G06K 9/00805 |
| 2007/0023223 A1* | 2/2007 | Okamoto | B32B 17/10761 |
| | | | 180/274 |

FOREIGN PATENT DOCUMENTS

| | | | | |
|---|---|---|---|---|
| JP | 2016011097 A | | 1/2016 | |
| JP | 2016117419 A | * | 6/2016 | B60R 21/36 |
| JP | 2017171269 A | * | 9/2017 | |

\* cited by examiner

[FIG. 1]
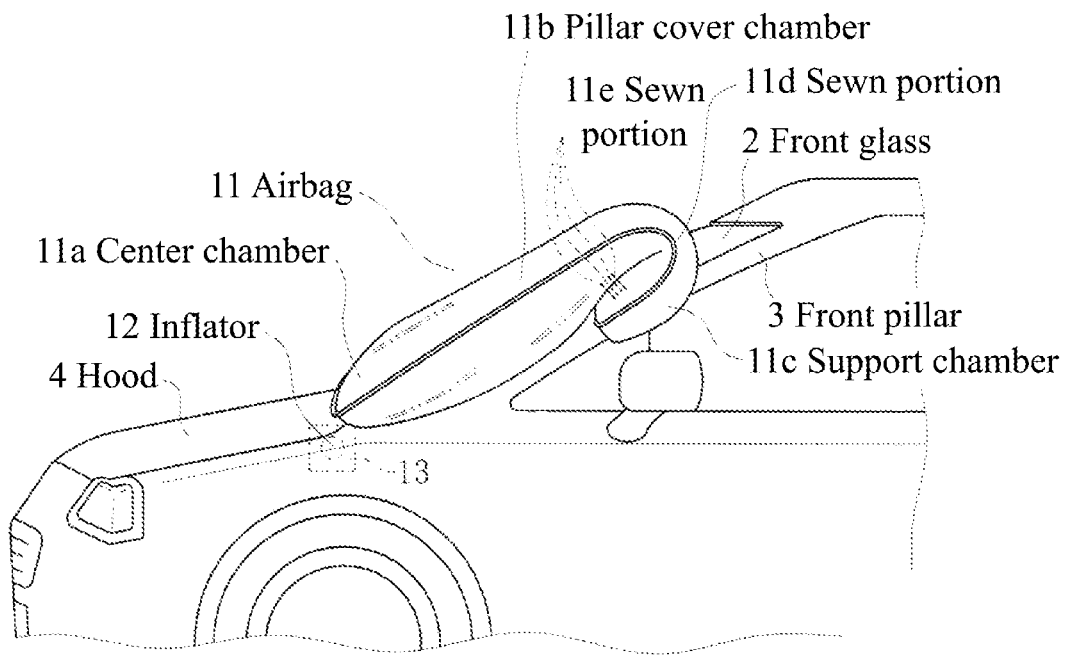
[FIG. 2]
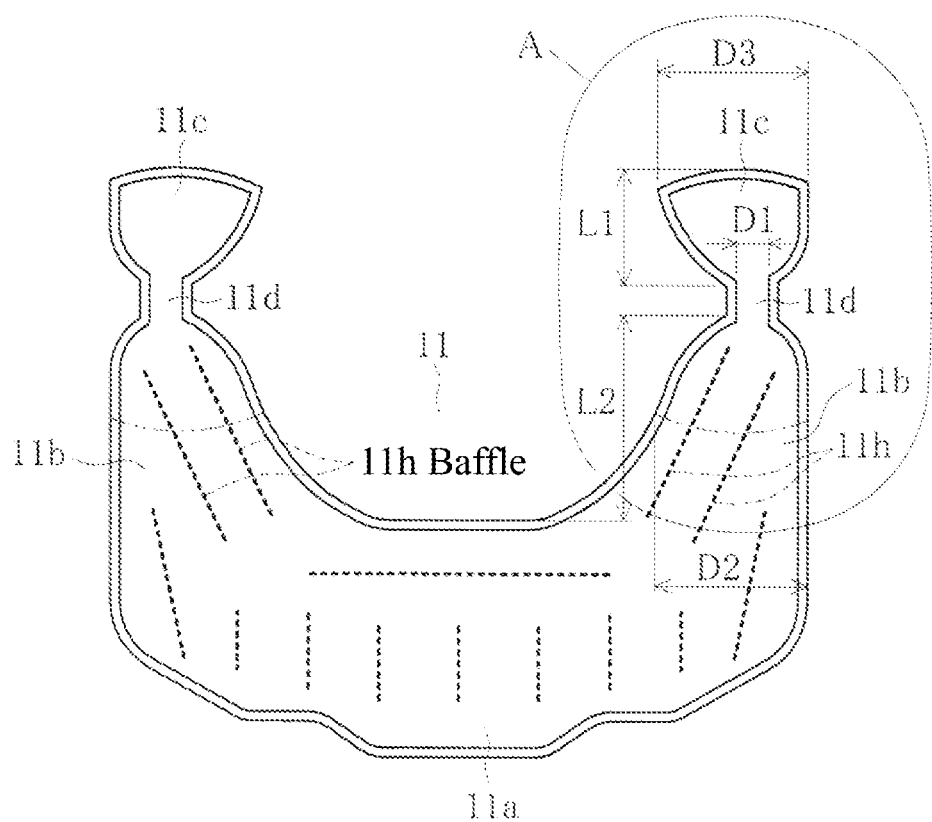

[FIG. 3]
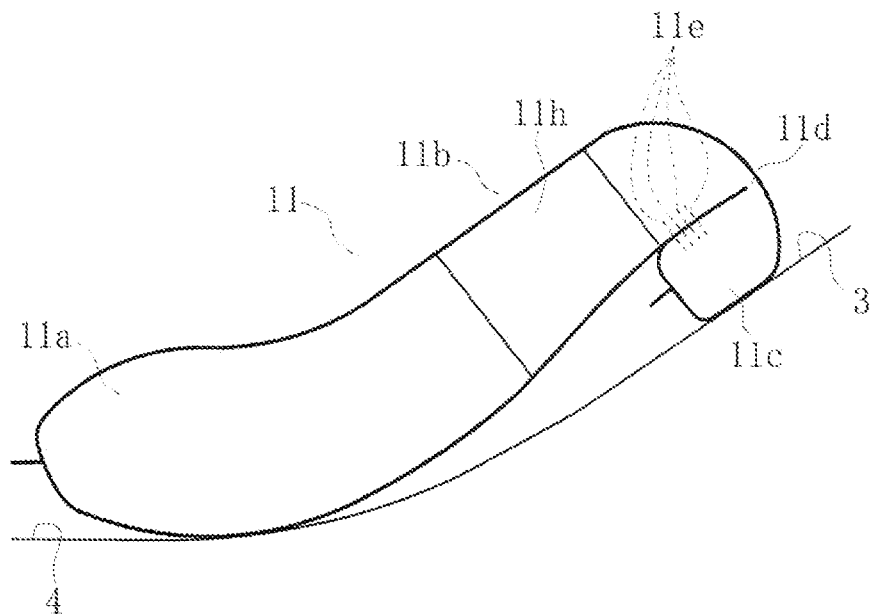
[FIG. 4]
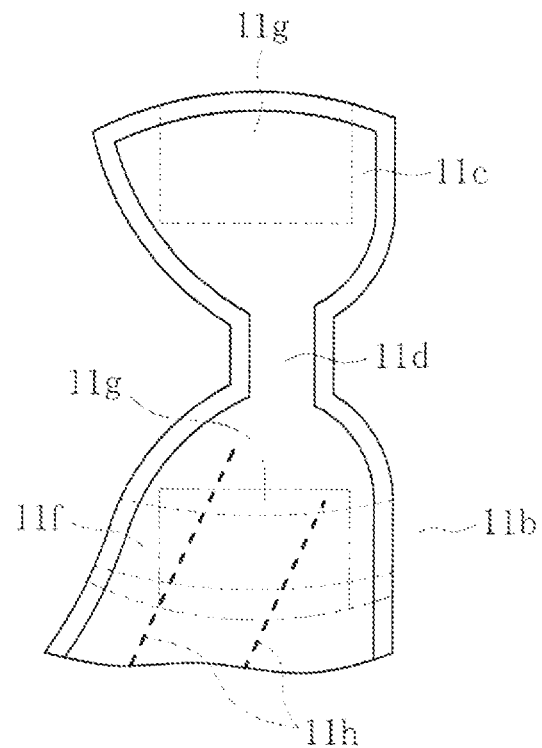

[FIG. 5]
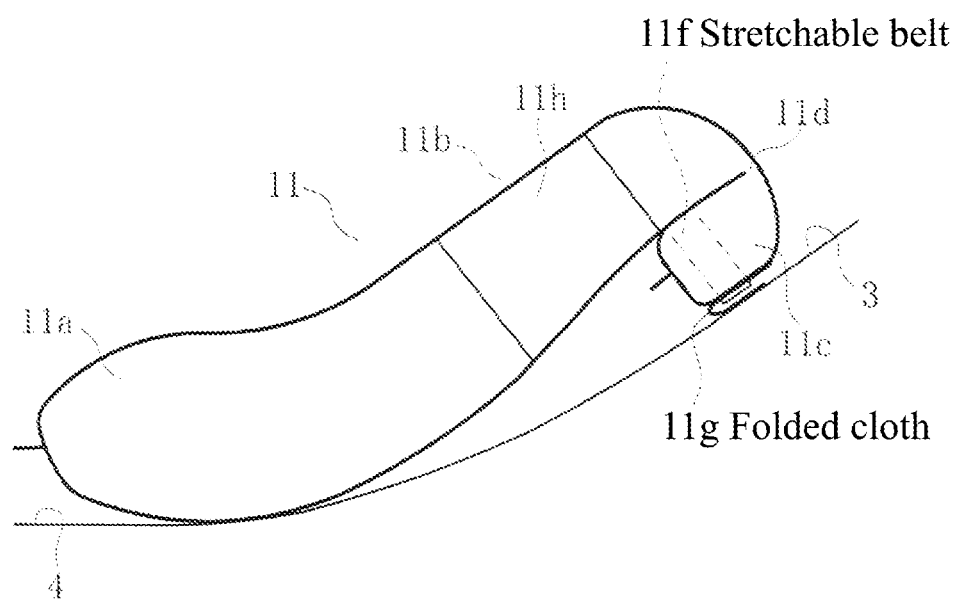

[FIG. 6A]
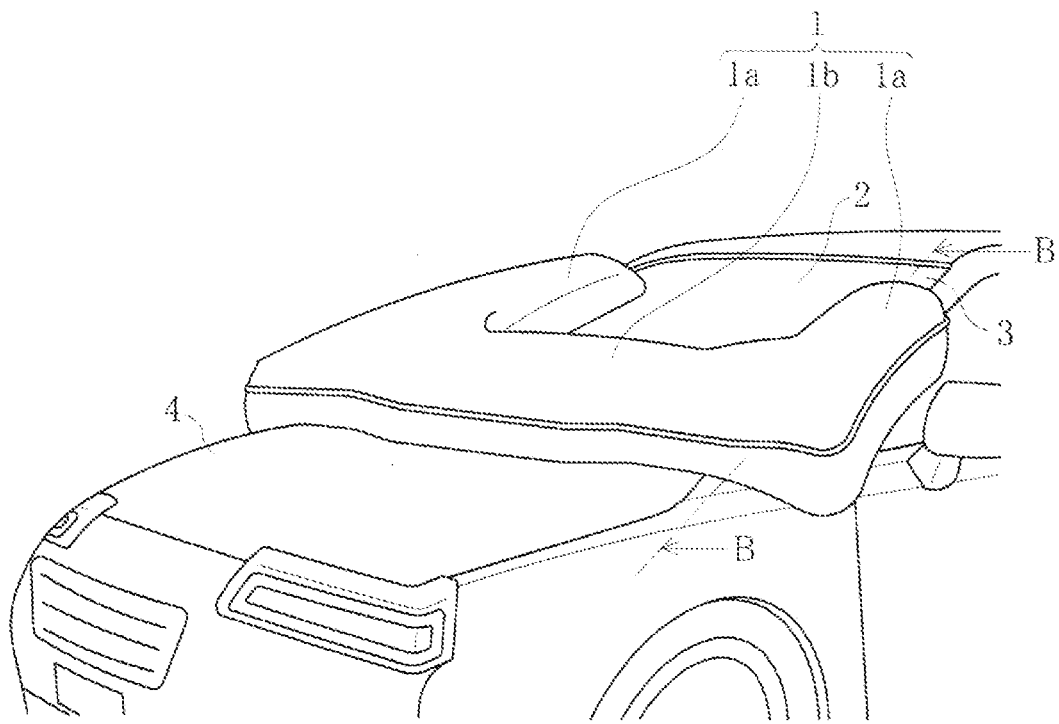
[FIG. 6B]
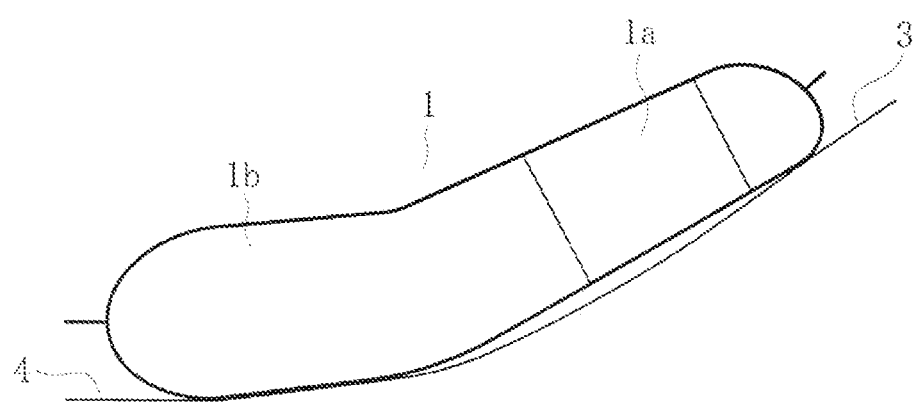

PEDESTRIAN PROTECTING AIRBAG APPARATUS

CROSS-REFERENCE TO RELATED APPLICATIONS

This application claims the benefit of Japanese Patent Application No. 2018-128097 filed on Jul. 5, 2018 and Japanese Patent Application No. 2019-105081 filed on Jun. 5, 2019, the disclosure of both which are herein incorporated by reference in their entirety.

TECHNICAL FIELD

The present invention relates to a pedestrian protection airbag apparatus for protecting a pedestrian from the impact of a collision when an automobile collides with the pedestrian.

BACKGROUND

Airbag apparatuses mounted on automobiles have recently protected both passengers and pedestrians (for example, Patent Document 1). Among these, a pedestrian protection airbag apparatus for protecting pedestrians prevents pedestrians who run up onto the hood during a collision from being hit hard by high strength parts such as the front pillar.

With this pedestrian protection airbag apparatus, when an automobile collides with a pedestrian, an airbag is expanded from a space formed by lifting the rear side (front glass side) of the hood. As illustrated in FIG. 6(a), the expanded airbag 1 covers the vicinity of the lower (the hood 4 side) end of a front glass 2 along with at least a lower part (side part of the hood 4) of a front pillar 3.

In the case of such a pedestrian protection airbag apparatus, it is effective to increase the thickness of a pillar cover chamber 1a of the airbag 1 covering the front pillar 3, in addition to increasing the energy absorption amount when a pedestrian collides with the front pillar 3.

Unfortunately, if the thickness of the pillar cover chamber 1a of the airbag 1 is simply increased, without increasing the gas generation amount of an inflator, it causes a shortage in the collision energy absorption amount at a center chamber 1b (see FIG. 6(b)) covering the vicinity of the lower end of the front glass 2. In this case, the collision of a pedestrian with the lower end of the front glass makes it difficult to maintain protection performance.

Patent Document 2 proposes a pedestrian protection airbag apparatus in which a spherical enlarged portion (in which the internal space is enlarged compared with that of the pillar cover chamber) is formed at the rear end of a pillar cover chamber.

The collision energy absorption amount in this spherical enlarged portion is larger than the collision energy absorption amount in a pillar cover chamber portion, with the collision energy absorption amount in the pillar cover chamber portion remaining unchanged. Moreover, in the case of the pedestrian protection airbag apparatus proposed in Patent Document 2, only the spherical enlarged portion has an improved collision energy absorption amount, along with improved performance during a collision with a pedestrian, with the protection performance at the pillar cover chamber portion not improved.

PRIOR ART DOCUMENTS

Patent Documents

[Patent Document 1] JP 2013-502342 W
[Patent Document 2] JP 2016-11097 A

SUMMARY OF THE INVENTION

Problem to be Solved by the Invention

The problem to be solved by the present invention is that if the thickness of a pillar cover chamber of an airbag is simply increased, a collision of a pedestrian with the lower end of the front glass makes it difficult to maintain protection performance.

Moreover, if a spherical enlarged portion is formed at the rear end of the pillar cover chamber, only the spherical enlarged portion has an improved collision energy absorption amount, along with improved performance during a collision with a pedestrian.

Means for Solving the Problem

The present invention has been created in order to solve the problem, with the object of maintaining protection performance when a pedestrian collides with the lower end of the front glass, in addition to improving protection performance when colliding with a pillar, without increasing the gas generation amount of an inflator.

The present invention is a pedestrian protection airbag apparatus, including: an airbag for covering the vicinity of the end on the hood side of a front glass along with at least a part of the lower side of a pillar; and an inflator for supplying gas to the airbag during a collision.

In addition, the airbag includes: a center chamber for covering the vicinity of the end on the hood side of the front glass; a pillar cover chamber for covering at least the part of the lower side of the pillar; and a support chamber for expanding between this pillar cover chamber and the pillar.

In the present invention, because the support chamber which is expanded between the pillar cover chamber and the pillar is provided, if the gas generation amount of the inflator is the same, the airbag covering the pillar cover part is thicker compared with the case of increasing the thickness of the pillar cover chamber. Therefore, while maintaining protection performance when a pedestrian collides with the lower end of the front glass, it is possible to improve protection performance when colliding with the pillar.

In the present invention, even if the length of the support chamber in the longitudinal direction of the pillar is not identical to but rather shorter than the length of the pillar cover chamber in the longitudinal direction of the pillar, the protection performance when colliding with the pillar is improved.

Moreover, in the present invention, the pillar cover chamber and the support chamber, for example, are preferably coupled at the upper ends of both chambers via a coupling portion, such that gas is able to pass therethrough, wherein this coupling portion preferably has a smaller cross-sectional area than the cross-sectional area of the cross-section orthogonal to the longitudinal direction of the pillar in both chambers. With such a configuration, the coupling portion tends to be bent, with the support chamber more likely to be disposed between the pillar cover chamber and the pillar.

Moreover, in the present invention, in order to expand the support chamber between the pillar cover chamber and the pillar when expanding the airbag, the relative position between the support chamber and the pillar cover chamber may be maintained with the support chamber folded on the back side of the pillar cover chamber.

As the configuration in which the relative position between the support chamber and the pillar cover chamber can be maintained, the support chamber and the pillar cover chamber may be joined or engaged. Among these, while the embodiment of joining involves sewing, adhering, etc., it is not particularly limited thereto. In contrast, in the case of engagement, the embodiment in which the engaged state can be maintained after expansion is not particularly limited.

Moreover, in the present invention, by providing a baffle inside the pillar cover chamber in the longitudinal direction of the pillar, the thickness of the pillar cover chamber can be assuredly maintained.

The baffle may be singular; however, if multiple baffles are provided, the thickness of the pillar cover chamber covering the pillar is more assuredly maintained. In this case, the multiple baffles are preferably provided in parallel.

Effects of the Invention

In the present invention, because the support chamber which is expanded between the pillar cover chamber and the pillar is provided in the airbag, if the gas generation amount of the inflator is the same, the airbag covering the pillar cover part is thicker compared with the case of increasing the thickness of the pillar cover chamber.

Therefore, while maintaining the protection performance when a pedestrian collides with the lower end of the front glass, it is possible to improve the protection performance when colliding with the pillar.

BRIEF DESCRIPTION OF THE DRAWINGS

FIG. 1 is a view of the expanded state of an airbag of a pedestrian protection airbag apparatus according to the present invention when seen from the side face direction of an automobile.

FIG. 2 is a flat view before folding a support chamber of the airbag of the pedestrian protection airbag apparatus according to the present invention.

FIG. 3 is a cross-sectional view of a pillar cover chamber and a support chamber portion in the expanded state of the airbag illustrated in FIG. 2.

FIG. 4 is an enlarged view of portion A of FIG. 2 describing Example 2 of the pedestrian protection airbag apparatus according to the present invention.

FIG. 5 is a view of the airbag illustrated in FIG. 4, similar to FIG. 3.

FIG. 6(a) is a perspective view illustrating the expanded state of a conventional pedestrian protection airbag apparatus, while FIG. 6(b) is a cross-sectional view along line B-B of FIG. 6(a).

DESCRIPTION OF THE PREFERRED EMBODIMENT

Simply increasing the thickness of an airbag part covering a pillar causes a shortage in the collision energy absorption amount at a center chamber covering the vicinity of the lower end of a front glass, making it difficult to maintain protection performance when a pedestrian collides with the lower end of the front glass.

The present invention solves this problem by providing, in an airbag, a support chamber expanded between the pillar cover chamber and the pillar, in addition to the center chamber and a pillar cover chamber.

EXAMPLES

Examples of the present invention will hereinafter be described with reference to FIGS. 1 to 5.

The pedestrian protection airbag apparatus according to the present invention includes: an airbag 11 for covering, from the outside of an automobile, the vicinity of the end on the lower side (the hood side) of a front glass 2 along with at least a part of the lower side of a front pillar 3; and an inflator 12 for supplying gas to the airbag 11 during a collision.

The airbag 11 has: a center chamber 11a for covering the vicinity of the lower end of the front glass 2 over the entire region of the automobile in the width direction; and a pillar cover chamber 11b which is continuously formed so as to extend along the front pillar 3 from both sides of this center chamber 11a. The extension length of this pillar cover chamber 11b may be of a length covering at least the part of the lower side of the front pillar 3, but may not necessarily be of a length which covers the entire region in the longitudinal direction of the front pillar 3. FIG. 1 illustrates the covering of three fourths of the length in the longitudinal direction of the front pillar 3.

Moreover, the present invention has, in addition to the center chamber 11a and the pillar cover chamber 11b, a support chamber 11c which is continuously formed so as to extend along the front pillar 3 forms the rear end of both pillar cover chambers 11b.

In the present example, as illustrated in FIG. 2, the length of the support chamber 11c in the longitudinal direction L1 of the front pillar 3 is shorter than the length of the pillar cover chamber 11b in the longitudinal direction L2 of the front pillar 3.

Moreover, in the present example, the pillar cover chamber 11b and the support chamber 11c, for example, are connected at the upper end part of the pillar cover chamber 11b, such that gas can pass from the pillar cover chamber 11b to the support chamber. The connection part serves as the upper end part of the pillar cover chamber 11b and the support chamber 11c in an expanded state (see FIGS. 1, 3, and 5). In addition, as illustrated in FIG. 2, the cross-sectional area D1 of the cross-section in a coupling portion 11d (serving as the connection part) orthogonal to the longitudinal direction of the front pillar 3 installed in the automobile is smaller than the cross-sectional areas D2, D3 of the cross-sections in both chambers 11b, 11c orthogonal to the longitudinal direction of the front pillar 3.

In addition, in the present invention, it is a prominent characteristic that, as illustrated in FIGS. 1, 3, and 5, the support chamber 11c is expanded between the pillar cover chamber 11b and the front pillar 3.

As illustrated by imaginary lines in FIGS. 2, 4, the configuration of expanding the support chamber 11c between this pillar cover chamber 11b and the front pillar 3 maintains the state in which the support chamber 11c is folded on the back side of the pillar cover chamber 11b in the following configuration.

For example, in the examples illustrated in FIGS. 1 to 3, the rear end part of the support chamber 11c folded on the back side of the pillar cover chamber 11b is sewn with the pillar cover chamber 11b. 11e in FIGS. 1 and 3 illustrates a sewn portion.

Moreover, in examples illustrated in FIGS. 4, 5, when the support chamber 11c is folded on the back side of the pillar cover chamber 11b, the support chamber 11c is passed through a stretchable belt 11f provided on the back face side of the pillar cover chamber 11b. In addition, it is illustrated that in order to enable the passed state to be maintained even when expanding the airbag 11, a folded cloth 11g is provided at the rear end of the support chamber 11c, with the folded cloth 11g and the support chamber 11c sandwiching and engaging with the stretchable belt 11f.

Due to the abovementioned configuration maintaining the relative position between the folded the support chamber 11c and the pillar cover chamber 11b, the support chamber 11c is expanded between the pillar cover chamber 11b and the front pillar 3.

As illustrated in FIGS. 2, 4, for example, by providing two baffles 11h inside the pillar cover chamber 11b of the thus configured airbag 11 in parallel in the longitudinal direction of the front pillar 3, the thickness of the pillar cover chamber 11b can be assuredly maintained.

The inflator 12 for generating high pressure gas upon receiving a signal from a sensor for detecting the impact (when the automobile collides with a pedestrian) to expand the airbag 11 is installed in the airbag 11. This inflator 12 is not limited to a type in which a gas generating agent is used, but may be a type in which the high pressure gas is encapsulated, with an appropriate number of inflators 12 installed in accordance with the generation amount of the high pressure gas along with the capacity of the airbag 11.

Moreover, the airbag 11, along with the inflator 12 installed in this airbag 11, is folded and stored inside a case 13 installed on the back side of a hood 4 (see FIG. 1.)

In the thus configured pedestrian protection airbag apparatus according to the present invention, when the automobile collides with a pedestrian, the sensor detects the impact at collision, operates the inflator 12, and generates high pressure gas. The generated high pressure gas is supplied to the airbag 11 so as to expand the folded airbag 11.

The case 13 storing the airbag 11 is opened as the airbag 11 is expanded, such that the airbag 11 coming out of this case 13 is expanded towards the outside of the automobile from a space formed on the rear side of the hood 4 so as to cover the vicinity of the lower end of the front glass 2 along with the front pillar 3.

The embodiment in which the expansion of this airbag 11 allows the center chamber 11a to cover the vicinity of the lower end of the front glass 2 is similar to conventional ones, with no differences therebetween.

In contrast, in the embodiment in which the pillar cover chamber 11b covers the front pillar 3, in the present invention, as illustrated in FIGS. 3, 5, the support chamber 11c is disposed between the pillar cover chamber 11b and the front pillar 3.

That is, in the present invention, the height of the airbag 11 covering the front pillar 3 can be increased compared with the case of simply increasing the capacity of the pillar cover chamber 11b along with the height thereof. Therefore, if the gas generation amount of the inflator 12 is not increased, it is possible to improve the protection performance when a pedestrian collides with the front pillar 3, while maintaining the protection performance when the pedestrian collides with the lower end of the front glass 2.

Needless to say, while the present invention is not limited to the abovementioned examples, the embodiments may be appropriately changed within the scope of the technical ideas described in each claim.

That is, the abovementioned pedestrian protection airbag apparatus is a preferred example of the present invention, with other embodiments capable of being carried out or executed via various methods. Unless particularly limited in the specification of the present application, the shape, size, and configuration, arrangement, etc. of the detailed parts illustrated in the appended drawings in the present invention are not restricted. Moreover, the expressions and terms used in the specification of the present application are for the purpose of description and not limited thereto unless specifically limited.

The configuration in which the pillar cover chamber 11b and the support chamber 11c are coupled so as to maintain the relative position therebetween is not limited to the examples illustrated in FIGS. 1 to 5.

For example, while the pillar cover chamber 11b and the support chamber 11c illustrated in FIGS. 1 to 3 are sewn, they may instead be adhered.

Moreover, instead of simply sandwiching the stretchable belt 11f of the pillar cover chamber 11b with the folded cloth 11g and the support chamber 11c illustrated in FIGS. 4 and 5, the folded cloth 11g and the stretchable belt 11f may be stopped using a hook and loop fastener.

Moreover, while the example illustrates that two baffles 11h are provided in parallel in the longitudinal direction of the front pillar 3, these baffles 11h not necessarily required. Moreover, if baffles 11h are provided, the number of the baffles 11h is not limited to two, but may be one, or three or more. If multiple baffles 11h are provided, they do not necessarily have to be provided in parallel.

Moreover, in the example, while the length of the support chamber 11c in the longitudinal direction L1 of the front pillar 3 is shorter than the length of the pillar cover chamber 11b in the longitudinal direction L2 of the front pillar 3, they may be the same length if there is a margin in the generated amount of high pressure gas by the inflator 12.

Moreover, in the example, the cross-sectional area D1 of the coupling portion 11d between the pillar cover chamber 11b and the support chamber 11c is smaller than the cross-sectional areas D2, D3 of both chambers 11b, 11c. However, if the coupling portion 11d is easily bent, the cross-sectional area D1 of the coupling portion 11d does not necessarily have to be smaller than the cross-sectional areas D2, D3 of both chambers 11b, 11c.

REFERENCE NUMERALS

2 Front glass
3 Front pillar
4 Hood
11 Airbag
11a Center chamber
11b Pillar cover chamber
11c Support chamber
11d Coupling portion
11e Sewn portion
11f Stretchable belt
11g Folded cloth
11h Baffle
12 Inflator

The invention claimed is:

1. A pedestrian protecting airbag apparatus, comprising: an airbag for covering the vicinity of the end on the hood side of a front glass along with at least a part on the lower side of a pillar; and an inflator for supplying gas to the airbag during a collision,
wherein the airbag includes: a center chamber for covering the vicinity of the end on the hood side of the front glass; a pillar cover chamber for covering at least the part on the lower side of the pillar; and a support chamber for expanding between this pillar cover chamber and the pillar.

2. The pedestrian protecting airbag apparatus according to claim 1, wherein the length of the support chamber in the longitudinal direction of the pillar is shorter than the length of the pillar cover chamber in the longitudinal direction of the pillar.

3. The pedestrian protecting airbag apparatus according to claim 1 or 2, wherein the pillar cover chamber and the support chamber are coupled via a coupling portion with gas capable of passing therethrough, wherein this coupling portion has a smaller cross sectional area than the cross sectional area of the cross section orthogonal to the longitudinal direction of the pillar in both chambers.

4. The pedestrian protecting airbag apparatus according to claim 3, wherein the coupling portion is provided at the upper end part of the pillar cover chamber.

5. The pedestrian protecting airbag apparatus according to any one of claims 1, 2, and 4, wherein the support chamber is configured such that when the support chamber is folded on the back side of the pillar cover chamber, the relative position between the support chamber and the pillar cover chamber can be maintained.

6. The pedestrian protecting airbag apparatus according to claim 3, wherein the support chamber is configured such that when the support chamber is folded on the back side of the pillar cover chamber, the relative position between the support chamber and the pillar cover chamber can be maintained.

7. The pedestrian protecting airbag apparatus according to claim 5, wherein the configuration in which the relative position between the support chamber and the pillar cover chamber can be maintained is the joining between the support chamber and the pillar cover chamber.

8. The pedestrian protecting airbag apparatus according to claim 6, wherein the configuration in which the relative position between the support chamber and the pillar cover chamber can be maintained is the joining between the support chamber and the pillar cover chamber.

9. The pedestrian protecting airbag apparatus according to claim 5, wherein the configuration in which the relative position between the support chamber and the pillar cover chamber can be maintained is the engagement between the support chamber and the pillar cover chamber.

10. The pedestrian protecting airbag apparatus according to claim 6, wherein the configuration in which the relative position between the support chamber and the pillar cover chamber can be maintained is the engagement between the support chamber and the pillar cover chamber.

11. The pedestrian protecting airbag apparatus according to any one of claims 1, 2, 4, 6, 7, 8, 9, and 10, wherein a baffle is provided inside the pillar cover chamber in the longitudinal direction of the pillar.

12. The pedestrian protecting airbag apparatus according to claim 3, wherein a baffle is provided inside the pillar cover chamber in the longitudinal direction of the pillar.

13. The pedestrian protecting airbag apparatus according to claim 5, wherein a baffle is provided inside the pillar cover chamber in the longitudinal direction of the pillar.

14. The pedestrian protecting airbag apparatus according to claim 11, wherein multiple baffles are provided.

15. The pedestrian protecting airbag apparatus according to claim 12, wherein multiple baffles are provided.

16. The pedestrian protecting airbag apparatus according to claim 13, wherein multiple baffles are provided.

17. The pedestrian protecting airbag apparatus according to claim 14, wherein the multiple baffles are provided in parallel.

18. The pedestrian protecting airbag apparatus according to claim 15, wherein the multiple baffles are provided in parallel.

19. The pedestrian protecting airbag apparatus according to claim 16, wherein the multiple baffles are provided in parallel.

* * * * *